United States Patent
Yang et al.

(10) Patent No.: US 11,595,147 B2
(45) Date of Patent: Feb. 28, 2023

(54) DATA TRANSCEIVING METHOD AND DEVICE, AND WAVELENGTH CONFIGURATION METHOD AND DEVICE

(71) Applicant: ZTE CORPORATION, Guangdong (CN)

(72) Inventors: Wei Yang, Guangdong (CN); Hongliang Tian, Guangdong (CN); Aimin Chen, Guangdong (CN); Bo Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/419,335

(22) PCT Filed: Dec. 27, 2019

(86) PCT No.: PCT/CN2019/129136
§ 371 (c)(1),
(2) Date: Jun. 29, 2021

(87) PCT Pub. No.: WO2020/135700
PCT Pub. Date: Jul. 2, 2020

(65) Prior Publication Data
US 2022/0085907 A1  Mar. 17, 2022

(30) Foreign Application Priority Data
Dec. 29, 2018 (CN) .......................... 201811643628.8

(51) Int. Cl.
*H04J 14/02* (2006.01)
*H04B 10/40* (2013.01)

(52) U.S. Cl.
CPC .......... *H04J 14/0257* (2013.01); *H04B 10/40* (2013.01); *H04J 14/0221* (2013.01)

(58) Field of Classification Search
CPC .... H04B 10/40; H04J 14/0257; H04J 14/0221
(Continued)

(56) References Cited

U.S. PATENT DOCUMENTS

2012/0033974 A1* 2/2012 Ikai ..................... H04J 14/0276
398/79
2013/0315589 A1* 11/2013 Gao .................... H04J 14/0258
398/48

(Continued)

FOREIGN PATENT DOCUMENTS

CN          106059704 A       10/2016
CN          106911419 A        6/2017
(Continued)

OTHER PUBLICATIONS

WIPO, International Search Report dated Feb. 26, 2020.
European Patent Office, EP19901836.7 Extended European Search Report dated Sep. 15, 2022.

*Primary Examiner* — Dalzid E Singh
(74) *Attorney, Agent, or Firm* — Li & Cai Intellectual Property (USA) Office

(57) ABSTRACT

The present disclosure provides a data transceiving method, a data transceiving device, a wavelength configuration method and a wavelength configuration device. The data transceiving method includes that a first optical module receives control information sent by a second optical module; the first optical module adjusts transmission and receiving wavelengths according to the control information; and the first optical module executes transmission and receiving of data with the second optical module according to the adjusted transmission and receiving wavelengths.

15 Claims, 4 Drawing Sheets

(58) Field of Classification Search
USPC .......................................................... 398/96
See application file for complete search history.

(56) References Cited

U.S. PATENT DOCUMENTS

| | | | | |
|---|---|---|---|---|
| 2016/0099792 A1* | 4/2016 | Gao | ................... | H04J 14/0246 |
| | | | | 398/68 |
| 2017/0111137 A1* | 4/2017 | Gao | ....................... | H04B 10/27 |
| 2018/0254846 A1* | 9/2018 | Choi | ................... | H04J 14/0257 |
| 2019/0165865 A1* | 5/2019 | Nakagawa | .......... | H04J 14/0276 |
| 2019/0238250 A1* | 8/2019 | Tajima | ................ | H04B 10/572 |

FOREIGN PATENT DOCUMENTS

| | | | |
|---|---|---|---|
| CN | 107666354 A | 2/2018 |
| WO | WO 2010000153 A1 | 1/2010 |
| WO | WO 2010064981 A1 | 6/2010 |
| WO | WO 2014008659 A1 | 1/2014 |
| WO | WO 2015188298 A1 | 12/2015 |
| WO | WO 2016000205 A1 | 1/2016 |

* cited by examiner

DATA TRANSCEIVING METHOD AND DEVICE, AND WAVELENGTH CONFIGURATION METHOD AND DEVICE

CROSS-REFERENCE TO RELATED APPLICATIONS

This is a National Phase Application filed under 35 U.S.C. 371 as a national stage of PCT/CN2019/129136, filed on Dec. 27, 2019, an application claiming the priority of Chinese Patent Application No. 201811643628.8, filed on Dec. 29, 2018, the contents of which are incorporated herein in their entirety by reference.

TECHNICAL FIELD

The present disclosure relates to (but is not limited to) the field of communications.

BACKGROUND

At present, a radio access method is to connect a plurality of Remote Radio Units (RRUs) to Base Band Units (BBUs) in a point-to-point manner. For example, one or more RRUs are correspondingly connected to one or more BBUs through optical fibers. In practical applications, however, a plurality of long-distance optical fibers are additionally used due to the problems of the method such as long distances, resulting in a great waste of optical fiber resources. In addition, with the development of 5G (5th Generation Mobile Communication Technology), the number of RRUs will increase sharply, which indicates a large increase in the number of wavelengths. When the number of wavelengths increases, the labor cost will increase greatly if a correct port for connection needs to be manually found among numerous wavelength channels on the RRU side. Furthermore, various optical modules with different wavelengths need to be produced; and on-line RRUs must be referred to every time a new RRU is to be added to ensure that wavelengths of the new RRU are different from those of the on-line RRUs, which causes inflexible configuration of the RRUs. The increase in the number of wavelengths also indicates that Coarse Wavelength Division Multiplexing (CWDM), which will occupy too much frequency band resources, can no longer be used. The related art fails to propose a good solution to the problem of resource waste resulting from a large demand for optical fibers and inflexible RRU configuration in the radio access system.

SUMMARY

According to an embodiment of the present disclosure, a data transceiving method is provided and includes that a first optical module receives control information sent by a second optical module; the first optical module adjusts transmission and receiving wavelengths according to the control information; and the first optical module executes transmission and receiving of data with the second optical module according to the adjusted transmission and receiving wavelengths.

According to an embodiment of the present disclosure, a wavelength configuration method is provided and includes that a second optical module sends control information to a first optical module, and the control information is used by the first optical module to adjust transmission and receiving wavelengths; and the second optical module receives an optical signal sent by the first optical module according to the transmission and receiving wavelengths, and executes transmission and receiving of data with the first optical module.

According to another embodiment of the present disclosure, a data transceiving device located in a first optical module is provided and includes a first receiving module configured to receive control information sent by a second optical module; an adjustment module configured to adjust transmission and receiving wavelengths according to the control information; and an execution module configured to execute transmission and receiving of data with the second optical module according to the adjusted transmission and receiving wavelengths.

According to another embodiment of the present disclosure, a wavelength configuration device located in a second optical module is provided and includes a sending module configured to send control information to a first optical module, and the control information is used by the first optical module to adjust transmission and receiving wavelengths; and a second receiving module configured to receive an optical signal sent by the first optical module according to the transmission and receiving wavelengths, and execute transmission and receiving of data with the first optical module.

According to another embodiment of the present disclosure, a wavelength division multiplexing wireless access system is provided and includes a first optical module, a second optical module, a first arrayed waveguide grating (AWG), a second AWG and one optical fiber. The first optical module is coupled to the first AWG and is configured to receive control information sent by the second optical module, adjust transmission and receiving wavelengths and execute transmission and receiving of data with the second optical module; the second optical module is connected to the second AWG and is configured to send the control information to the first optical module and execute transmission and receiving of data with the first optical module; and the first AWG is connected to the second AWG through the one optical fiber.

According to still another embodiment of the present disclosure, a storage medium having a computer program stored therein is provided. When the computer program is executed by a processor, the processor performs the data transceiving method disclosed in the present disclosure.

According to still another embodiment of the present disclosure, a storage medium having a computer program stored therein is provided. When the computer program is executed by a processor, the processor performs the wavelength configuration method disclosed in the present disclosure.

According to still another embodiment of the present disclosure, an electronic device is provided and includes a memory having a computer program stored therein, and a processor. When the processor runs the computer program, the processor performs the data transceiving method disclosed in the present disclosure.

According to yet another embodiment of the present disclosure, an electronic device is provided and includes a memory having a computer program stored therein, and a processor. When the processor runs the computer program, the processor performs the wavelength configuration method disclosed in the present disclosure.

BRIEF DESCRIPTION OF THE DRAWINGS

The drawings described here are intended to provide a further understanding of the present disclosure and constitutes a part of the present application. The exemplary embodiments of the present disclosure and the description thereof are intended to explain the present disclosure, but do not constitute improper limitation to the present disclosure. In the drawings.

DETAILED DESCRIPTION

The present disclosure will be described in detail below with reference to the drawings and embodiments. It should be noted that the embodiments of the present disclosure and the features therein may be combined with each other if no conflict is incurred.

It should be noted that the terms "first", "second" and the like in description, claims, and drawings of the present disclosure are used for distinguishing between similar objects, but not necessarily for describing a particular order or chronological order.

Figure 1:
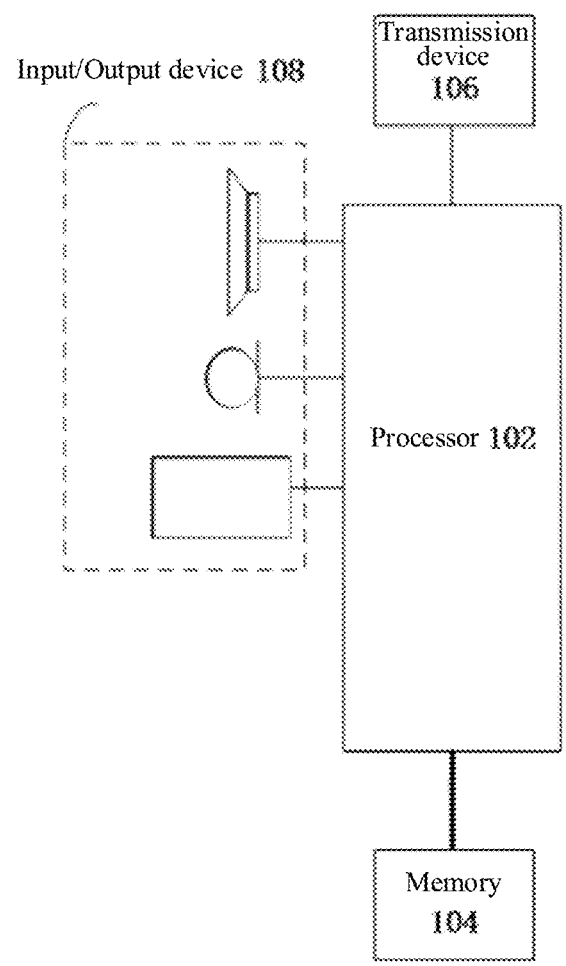
FIG. 1 is a block diagram illustrating a hardware structure of a mobile terminal in which a data transceiving method is performed according to the present disclosure.

The methods provided by the embodiments of the present disclosure can be performed in a mobile terminal, a computer terminal or a similar computing device. For example, the methods are performed in a mobile terminal, and FIG. 1 is a block diagram illustrating a hardware structure of a mobile terminal in which a data transceiving method is performed according to the present disclosure. As shown in FIG. 1, a mobile terminal 10 may include one or more processors 102 (only one processor is shown), and the processor 102 may include, but is not limited to, a processing device such as a microprocessor (e.g. a microcontroller unit (MCU)) or a programmable logic device (e.g. a field programmable gate array (FPGA)), and a memory 104 for storing data. Optionally, the mobile terminal may further include a transmission device 106 for communication functions and an input/output device 108. It should be understood by those of ordinary skill in the art that the structure shown in FIG. 1 is only for illustration and is not intended to limit the structure of the mobile terminal. For example, the mobile terminal 10 may include more or fewer components than those shown in FIG. 1, or may be configured in a way different from that shown in FIG. 1.

The memory 104 may be configured to store a computer program, such as a software program and a module of application software, e.g. a computer program corresponding to the data transceiving method in the embodiment of the present disclosure. By running the computer program stored in the memory 104, the processor 102 executes various functional applications and data processing, that is, implementing the above method. The memory 104 may include a high-speed random access memory, and may also include a non-volatile memory, such as a magnetic storage device, a flash memory, or other non-volatile solid-state memories. In some examples, the memory 104 may further include a memory remotely arranged relative to the processor 102, and the remote memory may be connected to the mobile terminal 10 via a network. Examples of the network include, but are not limited to, the Internet, an intranet, a local area network, a mobile communication network, and the combinations thereof.

The transmission device 106 is configured to receive or transmit data via a network. Specific examples of the network may include a wireless network provided by a communication provider of the mobile terminal 10. In one example, the transmission device 106 includes a Network Interface Controller (NIC), which can be connected to other network devices via a base station so as to communicate with the Internet. In another example, the transmission device 106 may be a Radio Frequency (RF) module, which is configured to communicate with the Internet in a wireless manner.

Figure 2:
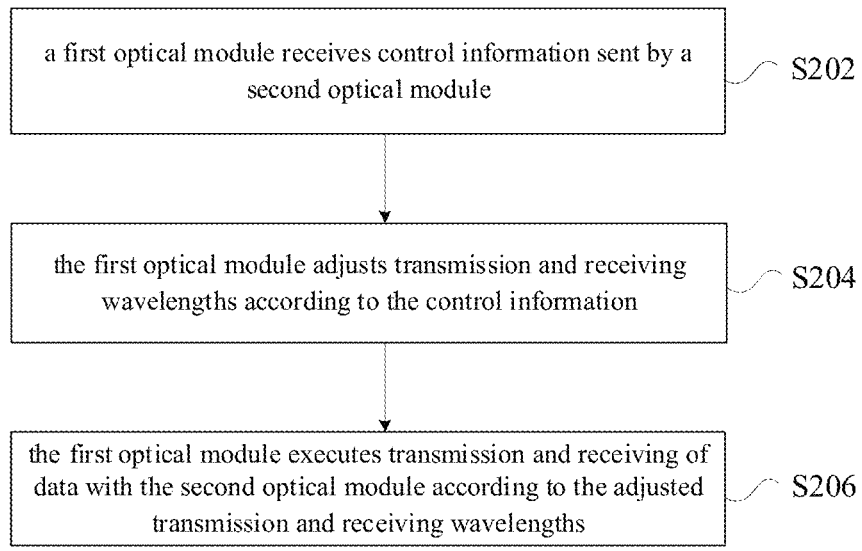
FIG. 2 is a flowchart illustrating a data transceiving method according to the present disclosure.

An embodiment of the present disclosure provides a data transceiving method performed in the above mobile terminal or network architecture. FIG. 2 is a flowchart illustrating a data transceiving method according to the present disclosure. As shown in FIG. 2, the method includes the following steps S202 to S206.

In step S202, a first optical module receives control information sent by a second optical module.

In step S204, the first optical module adjusts transmission and receiving wavelengths according to the control information.

In step S206, the first optical module executes transmission and receiving of data with the second optical module according to the adjusted transmission and receiving wavelengths.

Optionally, the number of the first optical modules is the same as that of the second optical modules, each of the first optical modules is connected to an RRU, respectively, the second optical modules are located in one Distributed Unit (DU), and all the RRUs are connected to the DU through one optical fiber.

Specifically, the first optical modules and the second optical modules are connected to each other through AWGs. An AWG at a side of the first optical modules and an AWG at a side of the second optical modules are connected to each other through one optical fiber.

Optionally, before the step in which the first optical module adjusts the transmission and receiving wavelengths according to the control information, the method further includes that the first optical module determines a transmission channel for executing the transmission and receiving of data according to the control information.

Optionally, the first optical module adjusts the transmission and receiving wavelengths to the transmission and receiving wavelengths corresponding to the transmission channel according to the control information; and the first optical module executes the transmission and receiving of data on the transmission channel according to the adjusted transmission and receiving wavelength.

Optionally, the step in which the first optical module receives the control information sent by the second optical module includes that the first optical module receives and analyzes an optical signal sent by the second optical module; and the first optical module acquires the control information according to Auxiliary Management and Control Channel (AMCC) information in the analyzed optical signal.

Specifically, one way to implement the AMCC is to adopt a top modulation technique, that is, to subject a modulated signal to secondary amplitude modulation so as to add the control information. The control information out of band may be implemented in other ways by the AMCC. It should be noted that the transmission and receiving of data is not interrupted when the AMCC is in use.

Optionally, when the received optical power corresponding to the first optical module decreases, the first optical module sends a correction instruction message to the corresponding second optical module for correcting the transmission wavelength of the second optical module; when the received optical power corresponding to the second optical module decreases, the first optical module sends a correction request message to the corresponding second optical module for correcting the transmission wavelength of the first optical module, and correct the transmission and receiving wavelengths according to a correction response message fed back by the second optical module.

Specifically, if the received optical power corresponding to the first optical module decreases, which indicates a wavelength shift of the transmission wavelength of the second optical module, the transmission wavelength of the second optical module needs to be adjusted. Therefore, the first optical module needs to send the correction instruction message to the second optical module for adjusting the transmission wavelength of the second optical module until the received optical power corresponding to the first optical module is restored to an original level.

Specifically, if the received optical power corresponding to the second optical module decreases, a wavelength shift may happen to the first optical module. In such case, if the first optical module does not receive any correction message from the second optical module or the correction message sent by the second optical module is incomplete, the first optical module actively sends the correction request message to the second optical module, and corrects the wavelength of the first optical module when receiving the correction response message fed back by the second optical module.

The above steps solve the problem of resource waste resulting from a large demand for optical fibers and inflexible RRU configuration in the related art, and produce the beneficial effects of flexible deployment and reduction of labor cost.

Through the above description of the embodiments, those of ordinary skill in the art can understand clearly that the method according to the above embodiments may be implemented by software together with a necessary general-purpose hardware platform, and may also be implemented by hardware. Based on such understanding, the technical solutions of the present disclosure may be implemented in the form of a software product, which is stored in a storage medium (such as a Read-Only Memory (ROM)/Random Access Memory (RAM), a magnetic disk and an optical disc) and includes several instructions to enable a terminal device (which may be a mobile phone, a computer, a server or a network device) to execute the method described in each embodiment of the present disclosure.

Figure 3:
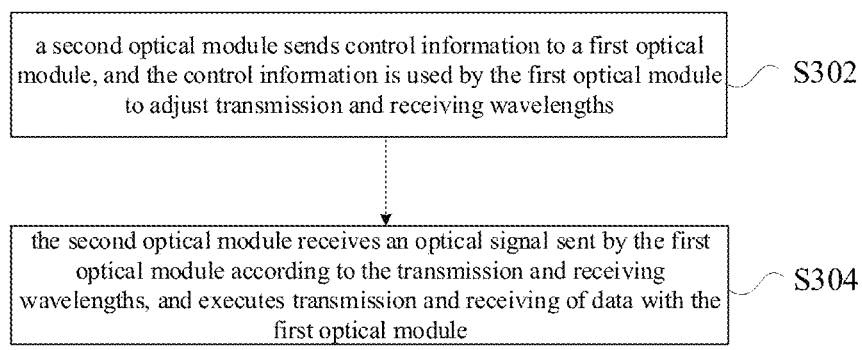
FIG. 3 is a flowchart illustrating a wavelength configuration method according to the present disclosure.

An embodiment of the present disclosure provides a wavelength configuration method performed in the above mobile terminal or network architecture. FIG. 3 is a flowchart illustrating a wavelength configuration method according to the present disclosure. As shown in FIG. 3, the method includes the following steps S302 to S304.

In step S302, a second optical module sends control information to a first optical module, and the control information is used by the first optical module to adjust transmission and receiving wavelengths.

In step S304, the second optical module receives an optical signal sent by the first optical module according to the transmission and receiving wavelengths, and executes transmission and receiving of data with the first optical module.

Optionally, the control information is further configured to determine a transmission channel for executing the transmission and receiving of data.

Optionally, before the step in which the second optical module sends the control information to the first optical module, the method further includes that the second optical module sets the control information in AMCC information.

Optionally, the control information includes the transmission and receiving wavelengths configured by the second optical module for the corresponding first optical module.

Optionally, when the received optical power corresponding to the second optical module decreases, the second optical module sends a correction instruction message to the corresponding first optical module for correcting the transmission wavelength of the first optical module; when the received optical power corresponding to the first optical module decreases, the second optical module sends a correction request message to the corresponding first optical module for correcting the transmission wavelength of the second optical module, and correct the transmission and receiving wavelengths according to a correction response message fed back by the first optical module.

Specifically, the second optical module may have a fixed transmission wavelength, in which case the transmission wavelength of the second optical module is not shifted. Therefore, the received optical power corresponding to the first optical module does not decrease in such case.

In addition, the transmission wavelength of the second optical module may be adjusted to a wavelength of any one channel. In such case, it is possible that the transmission wavelength of the second optical module is shifted.

Specifically, if the received optical power corresponding to the second optical module decreases, which indicates a wavelength shift of the transmission wavelength of the first optical module, the transmission wavelength of the first optical module needs to be adjusted. Therefore, the second optical module needs to send the correction instruction message to the first optical module for adjusting the transmission wavelength of the first optical module until the received optical power corresponding to the second optical module is restored to an original level.

Specifically, if the received optical power corresponding to the first optical module decreases, a wavelength shift may happen to the second optical module. In such case, if the second optical module does not receive any correction message from the first optical module or the correction message sent by the first optical module is incomplete, the second optical module actively sends the correction request message to the first optical module, and corrects the wavelength of the second optical module when receiving the correction response message fed back by the first optical module.

Optionally, the number of the first optical modules is the same as that of the second optical modules, each of the first optical modules is connected to an RRU, respectively, the second optical modules are located in one DU, and all the RRUs are connected to the DU through one optical fiber.

An embodiment of the present disclosure further provides a data transceiving device configured to implement the above data transceiving method embodiments, and what is illustrated above is not repeated here. The term "module" used below refers to software, hardware, or a combination of software and hardware that can perform predetermined functions. Although the device described in the following embodiment may be implemented by software, the implementations of the device by hardware or a combination of software and hardware are possible and can be conceived.

Figure 4:
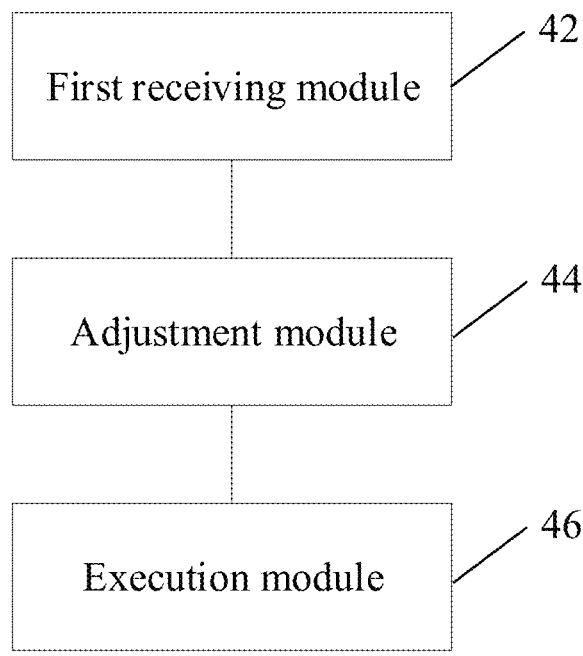
FIG. 4 is a block diagram of a data transceiving device according to the present disclosure.

FIG. 4 is a block diagram of a data transceiving device according to the present disclosure. As shown in FIG. 4, the device includes a first receiving module 42, an adjustment module 44 and an execution module 46.

The first receiving module 42 is configured to receive control information sent by a second optical module.

The adjustment module 44 is configured to adjust transmission and receiving wavelengths according to the control information.

The execution module 46 is configured to execute transmission and receiving of data with the second optical module according to the adjusted transmission and receiving wavelengths.

It should be noted that the above modules may be implemented by software or hardware.

When by hardware, the modules may be implemented in the following ways: all the modules are located in a same processor, or the modules are randomly combined and located in different processors. However, the implementation of the modules by hardware is not limited to the above ways.

An embodiment of the present disclosure further provides a wavelength configuration device configured to implement the above wavelength configuration method embodiments, and what is illustrated above is not repeated here. The term "module" used below refers to software, hardware, or a combination of software and hardware that can perform predetermined functions. Although the device described in the following embodiment may be implemented by software, the implementations of the device by hardware or a combination of software and hardware are possible and can be conceived.

Figure 5:
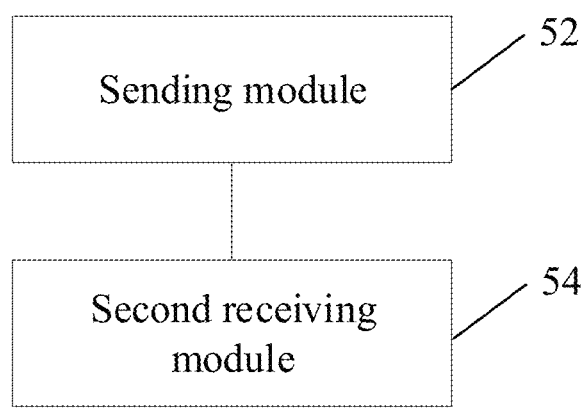
FIG. 5 is a block diagram of a wavelength configuration device according to the present disclosure.

FIG. 5 is a block diagram of a wavelength configuration device according to the present disclosure. As shown in FIG. 5, the device includes a sending module 52 and a second receiving module 54.

The sending module 52 is configured to send control information to a first optical module, and the control information is used by the first optical module to adjust transmission and receiving wavelengths.

The second receiving module 54 is configured to receive an optical signal sent by the first optical module according to the transmission and receiving wavelengths, and execute transmission and receiving of data with the first optical module.

It should be noted that the above modules may be implemented by software or hardware. When by hardware, the modules may be implemented in the following ways: all the modules are located in a same processor, or the modules are randomly combined and located in different processors. However, the implementation of the modules by hardware is not limited to the above ways.

An embodiment of the present disclosure further provides a wavelength division multiplexing wireless access system configured to implement the above embodiments, and what is illustrated above is not repeated here.

Figure 6:
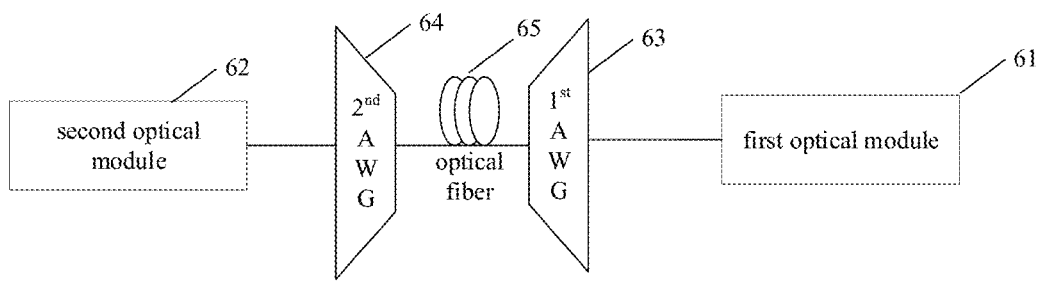
FIG. 6 is a block diagram of a wavelength division multiplexing wireless access system according to the present disclosure.

FIG. 6 is a block diagram of a wavelength division multiplexing wireless access system according to the present disclosure. As shown in FIG. 6, the system includes a first optical module 61, a second optical module 62, a first AWG 63, a second AWG 64 and one optical fiber 65. The first optical module 61 is coupled to the first AWG 63 and is configured to receive control information sent by the second optical module 62, adjust transmission and receiving wavelengths and execute transmission and receiving of data with the second optical module 62. The second optical module 62 is connected to the second AWG 64 and is configured to send the control information to the first optical module 61 and execute transmission and receiving of data with the first optical module 61. The first AWG 63 is connected to the second AWG 64 through the one optical fiber 65.

Figure 7:
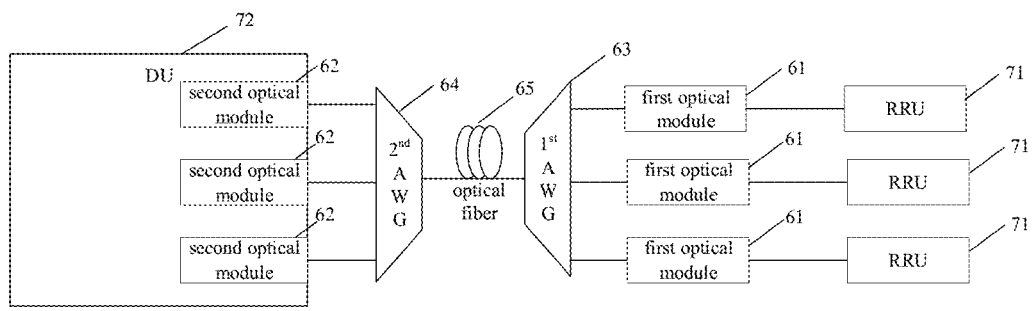
FIG. 7 is another block diagram of a wavelength division multiplexing wireless access system according to the present disclosure.

FIG. 7 is another block diagram of a wavelength division multiplexing wireless access system according to the present disclosure. The system shown in FIG. 7 is similar to that shown in FIG. 6. As shown in FIG. 7, the number of the first optical modules 61 is the same as that of the second optical modules 62, each of the first optical modules 61 is connected to an RRU 71, respectively, and the second optical modules 62 are located in one DU 72.

An embodiment of the present disclosure further provides a storage medium having a computer program stored therein. When the computer program is executed by a processor, the processor performs the method according to each embodiment of the present disclosure.

Optionally, the computer program stored in the storage medium can be run by the processor to perform the steps that a first optical module receives control information sent by a second optical module, the first optical module adjusts transmission and receiving wavelengths according to the control information, and the first optical module executes transmission and receiving of data with the second optical module according to the adjusted transmission and receiving wavelengths.

Optionally, the computer program stored in the storage medium can be run by the processor to perform the steps that a second optical module sends control information, which is configured to adjust transmission and receiving wavelengths by a first optical module, to the first optical module, and the second optical module receives an optical signal sent by the first optical module according to the transmission and receiving wavelengths and executes transmission and receiving of data with the first optical module.

Optionally, in the embodiment, the above storage medium may include, but is not limited to, various media capable of storing a computer program, such as a Universal Serial Bus Flash Disk (a USB flash disk), an ROM, an RAM, a mobile hard disk, a magnetic disk and an optical disc An embodiment of the present disclosure further provides an electronic device, including a memory having a computer program stored therein, and a processor configured to run the computer program to perform the steps of the method in any one of above embodiments.

Optionally, the electronic device may further include a transmission device connected to the processor, and an input/output device connected to the processor.

Optionally, the processor can run the computer program to perform the steps that a first optical module receives control information sent by a second optical module, the first optical module adjusts transmission and receiving wavelengths according to the control information, and the first optical module executes transmission and receiving of data with the second optical module according to the adjusted transmission and receiving wavelengths.

Optionally, the processor can run the computer program to perform the steps that a second optical module sends control information, which is configured to adjust transmission and receiving wavelengths by a first optical module, to the first optical module, and the second optical module receives an optical signal sent by the first optical module according to the transmission and receiving wavelengths and executes transmission and receiving of data with the first optical module.

Optionally, reference may be made to the examples described in the above embodiments and optional implementations for specific examples of the embodiment, and thus the specific examples of the embodiment are not described in detail here.

Apparently, it should be understood by those of ordinary skill in the art that all the modules or steps of the present disclosure described above may be implemented by a general-purpose computing device, may be integrated in a single computing device or distributed on a network composed of a plurality of computing devices. Optionally, the modules or steps may be implemented by program codes executable by a computing device, such that the modules or steps can be stored in a storage device and executed by a computing device. In some cases, the steps illustrated or described may be performed in an order different from that described herein. The modules or steps may be separately made into integrated circuit modules, or some of the modules or steps may be made into a single integrated circuit module. Thus, the present disclosure is not limited to any specific combination of hardware and software.

The description above is merely of the preferable embodiments of the present disclosure, but is not intended to limit the present disclosure. Various modifications and changes may be made to the present disclosure by those of ordinary skill in the art. Any modification, equivalent replacement and improvement made within the principle of the present disclosure should be included in the protection scope of the present disclosure.

What is claimed is:

1. A data transceiving method, comprising:
   receiving, by a first optical module, control information sent by a second optical module;
   adjusting, by the first optical module, transmission and receiving wavelengths according to the control information; and
   executing, by the first optical module, transmission and receiving of data with the second optical module according to the adjusted transmission and receiving wavelengths,
   wherein the number of the first optical modules is the same as that of the second optical modules, each of the first optical modules is connected to an Remote Radio Unit (RRU), respectively, the second optical modules are located in one Distributed Unit (DU), and all the RRUs are connected to the DU through one optical fiber.

2. The method of claim 1, wherein before the step of adjusting, by the first optical module, the transmission and receiving wavelengths according to the control information, the method further comprises:
   determining, by the first optical module, a transmission channel for executing the transmission and receiving of data according to the control information.

3. The method of claim 2, further comprising:
   adjusting, by the first optical module, the transmission and receiving wavelengths to transmission and receiving wavelengths corresponding to the transmission channel according to the control information; and
   executing, by the first optical module, the transmission and receiving of data on the transmission channel according to the adjusted transmission and receiving wavelength.

4. The method of claim 1, wherein the step of receiving, by the first optical module, the control information sent by the second optical module comprises:
   receiving and analyzing, by the first optical module, an optical signal sent by the second optical module; and
   acquiring, by the first optical module, the control information according to Auxiliary Management and Control Channel (AMCC) information in the analyzed optical signal.

5. The method of claim 1, further comprising:
   in response to received optical power corresponding to the first optical module decreasing, sending, by the first optical module, a correction instruction message to the corresponding second optical module for correcting the transmission wavelength of the second optical module; and
   in response to received optical power corresponding to the second optical module decreasing, sending, by the first optical module, a correction request message to the corresponding second optical module for correcting the transmission wavelength of the first optical module, and correcting the transmission and receiving wavelengths according to a correction response message fed back by the second optical module.

6. A storage medium having a computer program stored therein, wherein when the computer program is executed by a processor, the processor performs the data transceiving method of claim 1.

7. An electronic device, comprising a memory having a computer program stored therein, and a processor, wherein when the processor runs the computer program, the processor performs the data transceiving method of claim 1.

8. A wavelength configuration method, comprising:
   sending, by a second optical module, control information to a first optical module, wherein the control information is used by the first optical module to adjust transmission and receiving wavelengths; and
   receiving, by the second optical module, an optical signal sent by the first optical module according to the transmission and receiving wavelengths, and executing transmission and receiving of data with the first optical module,
   wherein the number of the first optical modules is the same as that of the second optical modules, each of the first optical modules is connected to an RRU, respectively, the second optical modules are located in one DU, and all the RRUs are connected to the DU through one optical fiber.

9. The method of claim 8, wherein the control information is further configured to determine a transmission channel for executing the transmission and receiving of data.

10. The method of claim 8, wherein before the step of sending, by the second optical module, the control information to the first optical module, the method further comprises:
    setting, by the second optical module, the control information in AMCC information.

11. The method of claim 8, wherein the control information comprises the transmission and receiving wavelengths configured by the second optical module for the corresponding first optical module.

12. The method of claim 8, further comprising:
    in response to received optical power corresponding to the second optical module decreasing, sending, by the second optical module, a correction instruction message to the corresponding first optical module for correcting the transmission wavelength of the first optical module; and in response to received optical power corresponding to the first optical module decreasing, sending, by the second optical module, a correction request message to the corresponding first optical module for correcting the transmission wavelength of the second optical module, and correcting the transmission and receiving wavelengths according to a correction response message fed back by the first optical module.

13. A storage medium having a computer program stored therein, wherein when the computer program is executed by a processor, the processor performs the wavelength configuration method of claim 8.

14. An electronic device, comprising a memory having a computer program stored therein, and a processor, wherein, when the processor runs the computer program, the processor performs the wavelength configuration method of claim 8.

15. A wavelength division multiplexing wireless access system, comprising a first optical module, a second optical module, a first arrayed waveguide grating (AWG), a second AWG and one optical fiber, wherein the first optical module is coupled to the first AWG and is configured to receive control information sent by the second optical module, adjust transmission and receiving wavelengths and execute transmission and receiving of data with the second optical module;

the second optical module is connected to the second AWG and is configured to send the control information to the first optical module and execute transmission and receiving of data with the first optical module; and the first AWG is connected to the second AWG through the one optical fiber, wherein the number of the first optical modules is the same as that of the second optical modules, each of the first optical modules is connected to an RRU, respectively, and the second optical modules are located in one DU.

* * * * *